2,723,757

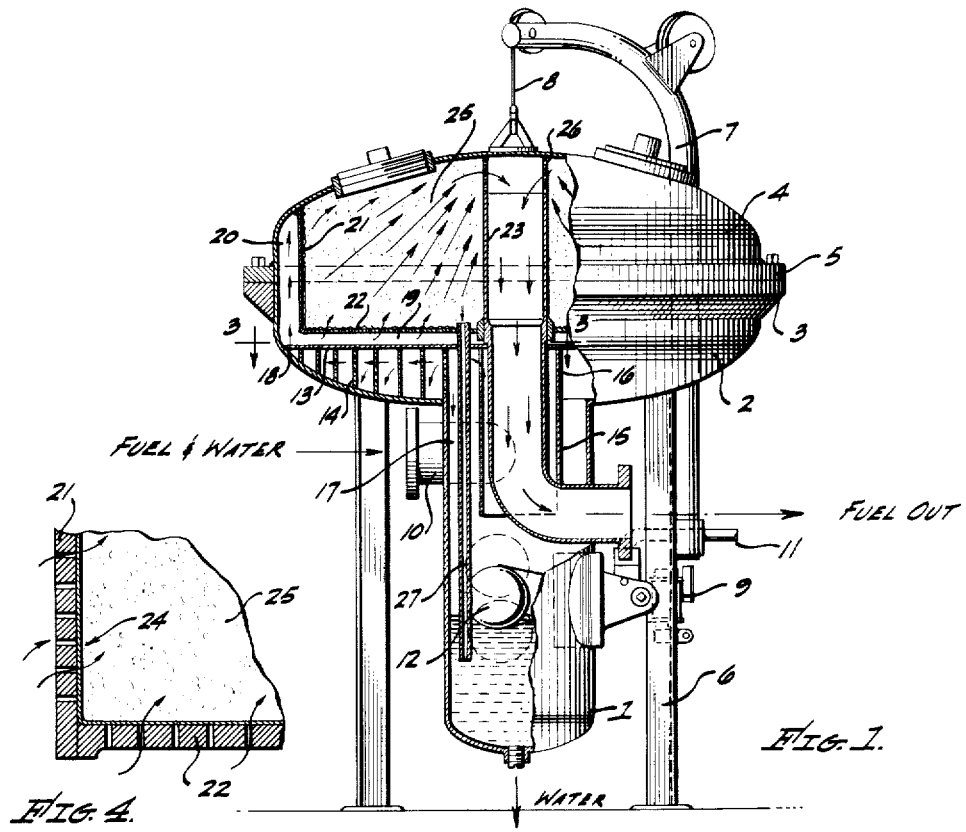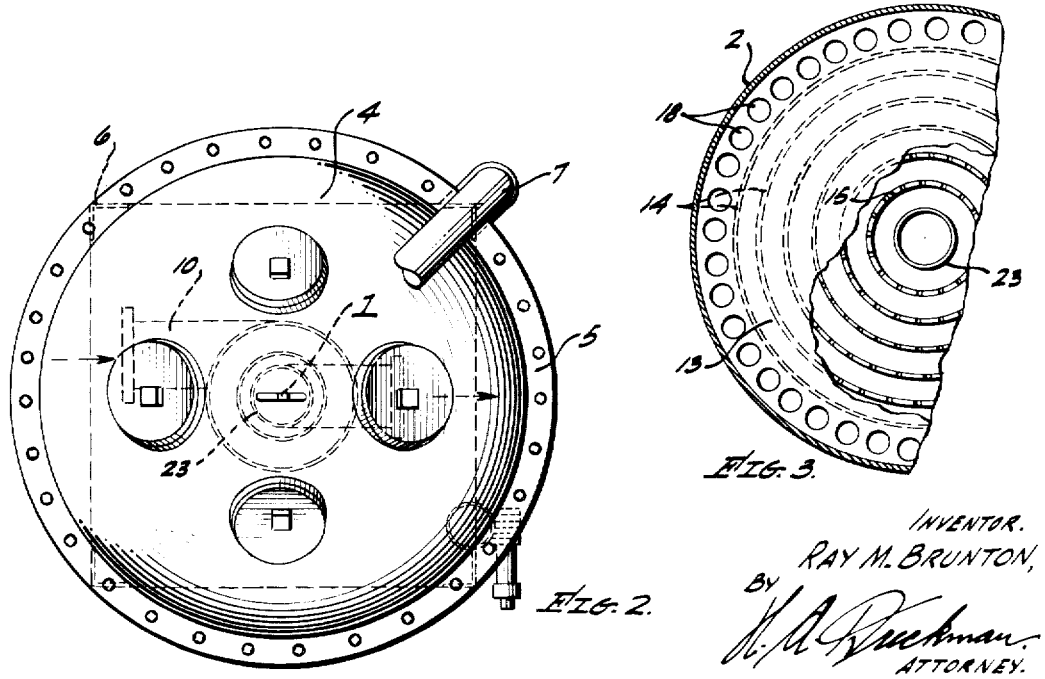

FUEL AND WATER SEPARATOR

Ray M. Brunton, Long Beach, Calif.

Application August 27, 1953, Serial No. 376,835

7 Claims. (Cl. 210—44)

This invention relates to a fuel and water separator, or a device to separate any two immiscible liquids, such as gasoline and water, other hydro-carbon fuels and water, etc.

An object of my invention is to provide a separator of the character stated, which will effectively remove relatively small quantities of water or other immsicible liquids from the gasoline or other liquid fuels.

Another object of my invention is to provide a separator of the character stated in which the separated water or other liquid does not contact the incoming flow of liquid.

A feature of my invention is to provide a novel fuel and water separator of the character stated in which the filter pack can be entirely removed for purposes of repacking or repair.

Another feature of my invention is to provide a separator of the character stated in which relatively small quantities of water can be entirely separated and eliminated from the gasoline or other liquid fuel.

Another feature of my invention is ot provide a novel fuel and water separator in which the water or other immiscible liquid is separated from the fuel during the continuous flow of the admixture through the separator.

Other objects, advantages and features of invention may appear from the accompanying drawing, the subjoined detailed description and the appended claims.

In the drawing:

Figure 1 is a longitudinal sectional view of my fuel and water separator.

Figure 2 is a top plan view of the separator.

Figure 3 is a fragmentary sectional view taken on line 3—3 of Figure 1.

Figure 4 is an enlarged fragmentary sectional view of the filtering walls in the upper chamber.

Referring more particularly to the drawing, my fuel and water separator consists of a cylindrical housing forming a sump 1. At the upper end of the sump 1 and forming an integral part thereof is an enlarged cup-like chamber 2. This chamber is flanged, as shown at 3, for the purpose of coupling or attaching the cap or hood 4 thereto. The hood 4 is also flanged, as shown at 5, and the flanges are bolted together, substantially as shown. Supporting legs 6 depend from the chamber 2 and support the entire structure at a suitable distance above the ground level. A winch or hoisting means includes a pipe 7 which extends above the hood 4 and includes a cable 8 which is attached to the hood and which extends to a manually operated winch structure 9 so that the hood 4 can be raised or lowered when desired, for the purpose of replacing the filter pack therein or for purposes of repair. A fuel and water intake pipe 10 extends tangentially into the sump 1 and preferably adjacent the upper end of this sump, that is, just below the chamber 2. The fuel and water is introduced into the intake 10 at a constant velocity of about ten feet per second. This velocity is not necessarily critical and can be varied somewhat. The incoming fluid has a spiral movement entering the sump, consequently, entrained water is removed to some extent.

The water which accumulates in the sump 1 is withdrawn through the water outlet 11, this outlet being controlled by the float 12, the construction of this float being usual and well known in the art. A horizontal floor 13 is provided in the chamber 2 and this floor extends horizontally and is spaced somewhat above the bottom wall of the chamber. A number of ring baffles 14 extend downwardly from the floor 13 to the bottom wall of the chamber 2. These baffles are perforated to permit fluid to pass horizontally therethrough. A tubular baffle 15 extends downwardly from the floor 13 and projects into the sump 1 to a point somewhat below the intake pipe 10. This tubular baffle is open at the bottom and a number of slots, holes or ports 16 are provided at the top thereof. The incoming fuel rises within the tubular baffle 15 and then passes horizontally through the port 16. The liquid strikes the annular baffles 14 and passes through the perforations in these baffles. During this movement of the fluid, and because of the impact thereof with the baffles 14, some water will be separated and will flow along the bottom of the chamber 2 and will then drop downwardly into the sump 1 through the space 17 between the wall of the sump 1 and the tubular baffle 15. After traversing the baffles 14 the liquid flows upwardly through the holes 18 adjacent the periphery of the floor 13. The moving liquid now passes into the channels 19 and 20. These channels are formed in the following manner:

An annular wall 21 extends downwardly from the hood 4. A second wall 22 (horizontal) extends from the bottom of the wall 20 to the central outlet pipe 23. The walls 21 and 22 have numbers of holes extending therethrough and both of these walls are covered with a chamois 24, or a similar filtering material. The space within the hood 4, inclosed by the walls 21 and 22, is filled with a suitable filtering material 25. The moving fluid, after passing through the walls 21—22 and traversing the filtering material 25, will pass through the ports 26, thence through the outlet pipe 23, and flows into a suitable storage tank. The water, which is filtered out of the fluid by the filter pack 25 and the chamois 24, will drop into the space 19 and will flow downwardly through the pipe 27 and will be collected in the bottom of the sump 1. Since the water is heavier than the gasoline or other fuel, it will always drop to the bottom and the flow of gasoline (even though it contains some water) will not be impeded by the flow of the separated water as it moves into the sump 1. The space below the floor 13 is ample to permit a column of water to be flowing along the bottom of the chamber 2 and a column of fuel to be flowing in the opposite direction towards the holes 18, and thence upwardly into the hood 4. The water, which is removed from the fuel by the filter pack 25 and the chamois 24, can drop into the space 19 and will then flow downwardly through the pipes 27. The discharge pipe 23 may be telescopic so that the hood 4 can be removed when necessary, and without having to remove the angular portion of the discharge pipe.

In operation fuel and its entrained water or other material is pumped into the intake pipe 10 as a velocity of about ten feet per second. The fluid then rises within the tubular baffle 15 and then passes horizontally and radially outwardly through the holes or ports 16 which are positioned below the floor 13. In its outward horizontal movement the fluid engages the ring baffles 14 and also passes through the perforations in these baffles. Some of the water will now drop out and fall to the bottom of the chamber 2 and then flows downwardly into the sump 1 through the space 17. The remaining fluid then passes upwardly through the holes 18 in the floor 13 and thence into the channels 19 and 20. The fluid then passes through the walls 21 and 22, that is, through the perforations in these walls and through the filtering cloth or material 24 and finally through the filtering material 25 where the remaining water, or the like, is removed and this water drops downwardly into the space 19 and passes into the sump 1 through the pipes 27. The clean fuel then passes through the ports 26 and into the outlet pipe 23 and is collected in a suitable storage tank. The water within the sump 1 is withdrawn from time to time and the level of the water in the sump may be controlled by the float controlled mechanism 12.

Having described my invention, I claim:

1. A fuel and water separator comprising a cylindrical sump, a chamber on the upper end of the sump, an intake pipe extending into the sump above the bottom of the sump, said sump having a water outlet therein, a horizontal floor in said chamber spaced above the bottom of the chamber, a plurality of spaced ring baffles depending from the floor, said floor having holes therein through which fluid passes, an outlet pipe extending vertically through the chamber and projecting out of the sump, and filter means positioned above said floor and extending vertically to surround the outlet pipe at its upper end.

2. A fuel and water separator comprising a cylindrical sump, a chamber on the upper end of the sump, an intake pipe extending into the sump above the bottom of the sump, said sump having a water outlet therein, a horizontal floor in said chamber spaced above the bottom of the chamber, a plurality of spaced ring baffles depending from the floor, said floor having holes therein through which fluid passes, an outlet pipe extending vertically through the chamber and projecting out of the sump, a hood enclosing the top of said chamber, filter means depending from the hood comprising a horizontal and vertical wall, said horizontal and vertical wall having holes therein through which fluid passes, filter material within said walls and within the hood, said filter means surrounding the outlet pipe at its upper end.

3. A fuel and water separator comprising a cylindrical sump, a chamber on the upper end of said sump, said chamber being of greater diameter than the sump, an intake pipe extending into the sump above the bottom of the sump, said sump having a water outlet therein, a horizontal floor in said chamber spaced above the bottom of the chamber, a plurality of spaced ring baffles depending from the floor, said baffles having holes therein through which fluid passes, an outlet pipe extending vertically through the chamber and projecting out of the sump, said outlet pipe being co-axial with said sump and chamber.

4. A fuel and water separator comprising a cylindrical sump, a chamber on the upper end of said sump, said chamber being of greater diameter than the sump, an intake pipe extending into the sump above the bottom of the sump, said sump having a water outlet therein, a horizontal floor in said chamber spaced above the bottom of the chamber, a plurality of spaced ring baffles depending from the floor, said baffles having holes therein through which fluid passes, an outlet pipe extending vertically through the chamber and projecting out of the sump, said outlet pipe being co-axial with said sump and chamber, a hood enclosing the top of said chamber, filter means mounted within the hood and comprising a horizontal and vertical wall, said walls having perforations therein through which fluid passes, a filter material within said walls and within the hood, said outlet pipe extending vertically through the hood, and said outlet pipe having ports adjacent the upper end thereof through which fluid passes after traversing the filter material, said filter means surrounding the outlet pipe at its upper end.

5. A fuel and water separator comprising a cylindrical sump, a chamber on the upper end of the sump, an intake pipe extending into the sump above the bottom of the sump, said sump having a water outlet therein, a horizontal floor in said chamber spaced above the bottom of the chamber, a plurality of spaced ring baffles depending from the floor, said floor having holes therein through which fluid passes, an outlet pipe extending vertically through the chamber and projecting out of the sump, a hood enclosing the top of said chamber, filter means within the hood comprising a horizontal and vertical wall, said horizontal and vertical wall having holes therein through which fluid passes, filter material within said walls and within the hood said filter means surrounding the outlet pipe at its upper end, and drain pipes extending through said wall and projecting into the sump.

6. A fuel and water separator comprising a cylindrical sump, a chamber on the upper end of said sump, said chamber being of greater diameter than the sump, an intake pipe extending into the sump above the bottom of the sump, said sump having a water outlet therein, a horizontal floor in said chamber spaced above the bottom of the chamber, a plurality of spaced ring baffles depending from the floor, said baffles having holes therein through which fluid passes, an outlet pipe extending vertically through the chamber and projecting out of the sump, said outlet pipe being co-axial with said sump and chamber, a hood enclosing the top of said chamber, filter means mounted within the hood and comprising a horizontal and vertical wall, said walls having perforations therein through which fluid passes, a filter material within said walls and within the hood, said outlet pipe extending vertically through the hood, and said outlet pipe having ports adjacent the upper end thereof through which fluid passes after traversing the filter material, and drain pipes extending through said wall and projecting into the sump.

7. A fuel and water separator comprising a cylindrical sump, a chamber on the upper end of the sump, said chamber being of greater diameter than the sump, an intake pipe extending into the sump above the bottom of the sump, said sump having a water outlet therein, a horizontal floor in said chamber spaced above the bottom of the chamber, a plurality of spaced ring baffles depending from the floor, said ring baffles having perforations therein through which fluid passes, said floor having holes therein adjacent its periphery through which fluid passes, a hood, means detachably securing the hood to the chamber, said hood enclosing the top of the chamber, an outlet pipe extending vertically through the hood and chamber and projecting out of the sump, a filter means within the hood and surrounding the outlet pipe, said filter means including a horizontal and vertical wall, both of said walls having holes there through which fluid passes, a filter material contained within the walls, and said outlet pipe having ports therein adjacent the top thereof through which fluid passes.

References Cited in the file of this patent

UNITED STATES PATENTS

| 1,921,689 | Meurk | Aug. 8, 1933 |
| 2,207,399 | Gaertner | July 9, 1940 |

FOREIGN PATENTS

| 121,869 | Austria | July 25, 1946 |